United States Patent [19]
Backer

[11] 3,790,331
[45] Feb. 5, 1974

[54] EXTRUDING FLOWER DESIGNS

[76] Inventor: Martin A. Backer, 434 E. South Temple, Salt Lake City, Utah

[22] Filed: June 14, 1971

[21] Appl. No.: 152,649

[52] U.S. Cl. .................. 425/464, 264/245, 425/87, 425/382, 426/516
[51] Int. Cl. .................................................. B29f 3/04
[58] Field of Search ...... 425/382, 461, 464; 99/138, 99/92, 86; 264/176 F, 177 F, 323

[56] References Cited
UNITED STATES PATENTS

| | | | |
|---|---|---|---|
| 2,750,900 | 6/1956 | Moore | 425/133 |
| 2,572,960 | 10/1951 | Steans | 220/93 X |
| 2,705,463 | 4/1955 | Moore | 425/131 |
| 1,526,112 | 2/1925 | Blackaller et al. | 425/382 X |
| 2,419,654 | 4/1947 | Moore | 425/461 |
| 2,320,496 | 6/1943 | Wechsler | 425/461 |
| 2,370,765 | 3/1945 | Atwood | 425/464 |
| 3,608,137 | 9/1971 | Wilson | 264/209 |
| 1,980,234 | 11/1934 | Taylor | 425/464 |
| 2,532,131 | 11/1950 | Van Voorst | 99/86 UX |
| 405,721 | 6/1889 | Smith | 425/382 X |

Primary Examiner—Tim R. Miles
Assistant Examiner—Steven L. Weinstein
Attorney, Agent, or Firm—Lynn G. Foster

[57] ABSTRACT

There is disclosed a method and apparatus for extruding flower designs from a plastic extrudate in essentially a one step operation. The die through which the extrudate is expressed includes means for moving the terminal ends of the petal forming strips laterally of the axis of extrudate movement upon cessation of extrusion.

11 Claims, 26 Drawing Figures

PATENTED FEB 5 1974 3,790,331
SHEET 1 OF 5
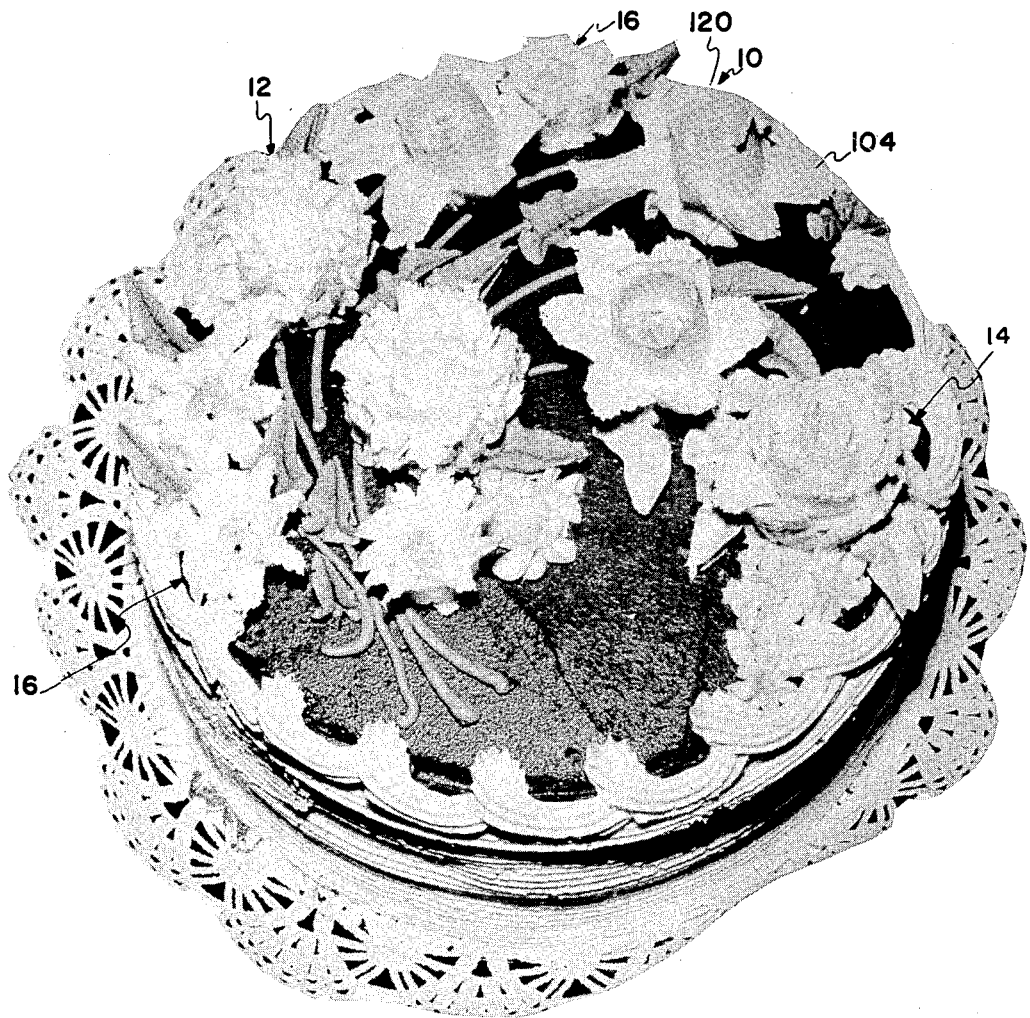
FIG. I
INVENTOR
MARTIN A. BACKER
BY Lynn G. Foster
ATTORNEY

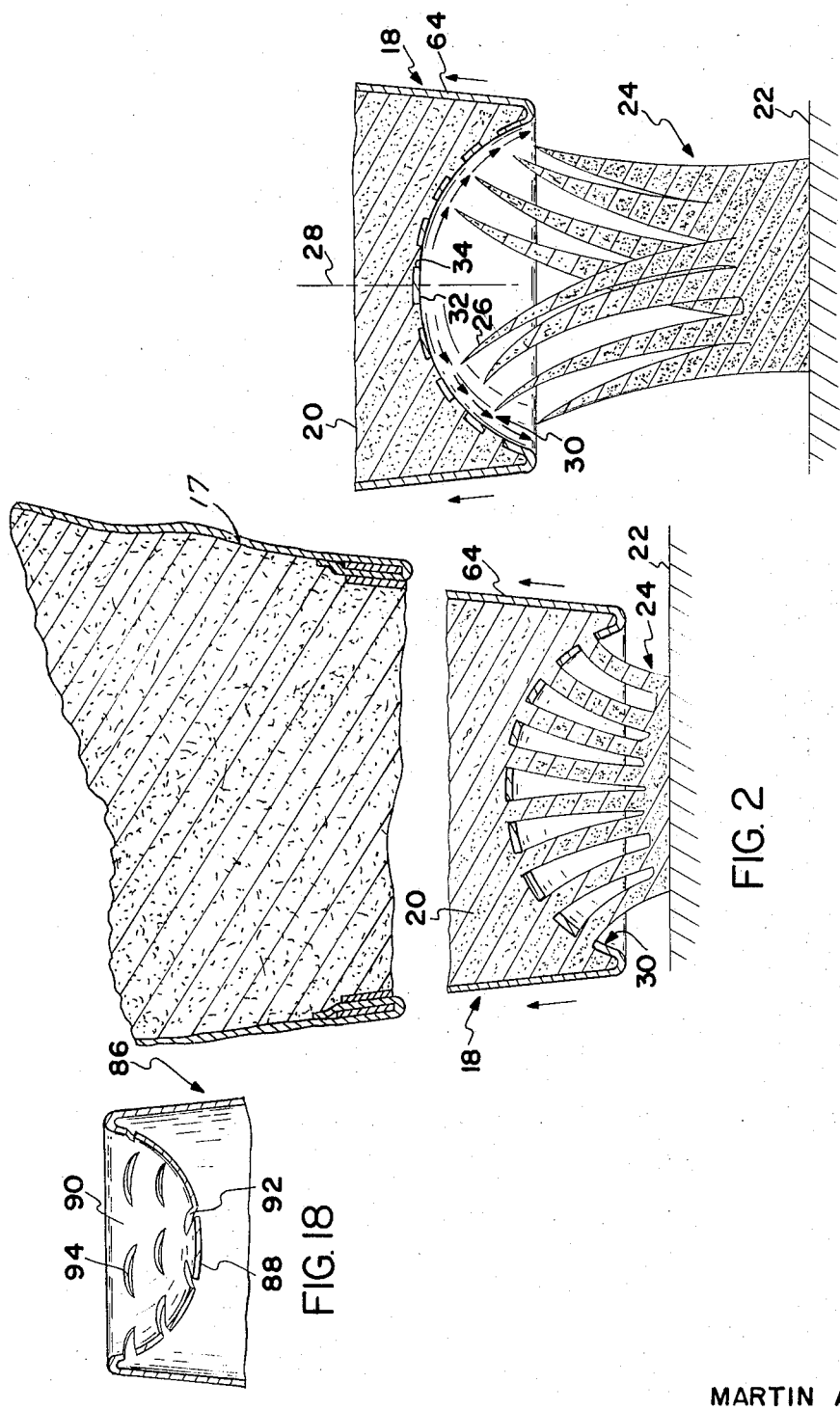

INVENTOR.
MARTIN A. BACKER
ATTORNEY

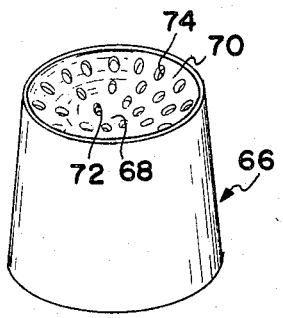
FIG. 6
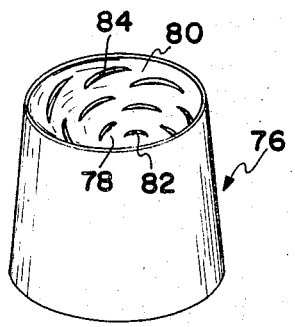
FIG. 7
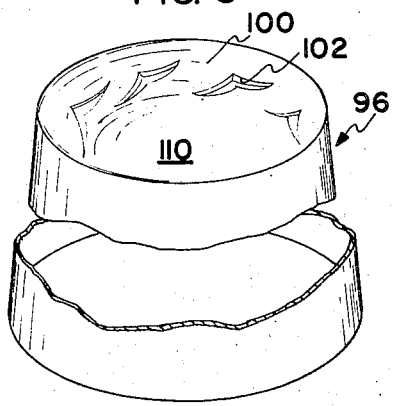
FIG. 9
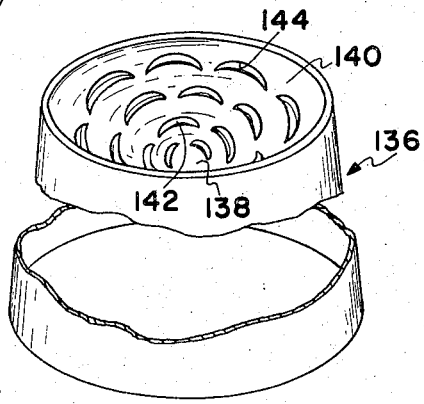
FIG. 12
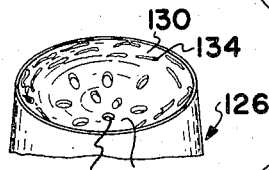
FIG. 8
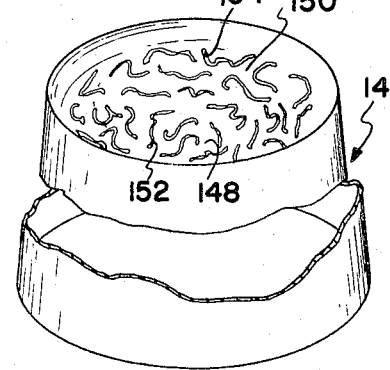
FIG. 13
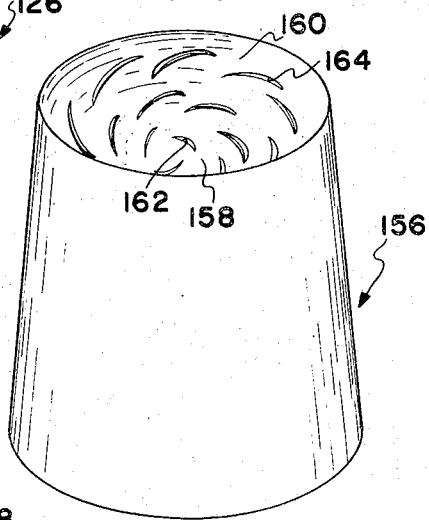
FIG. 14
FIG. 11
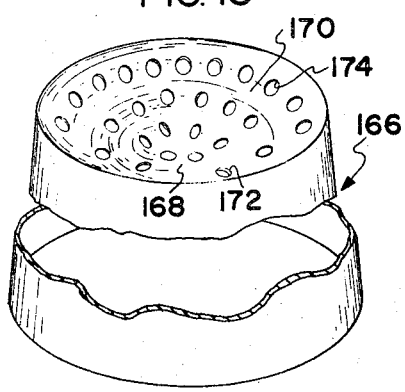
FIG. 15
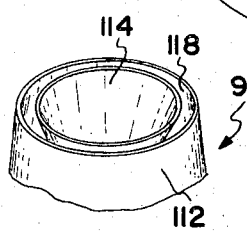
FIG. 10

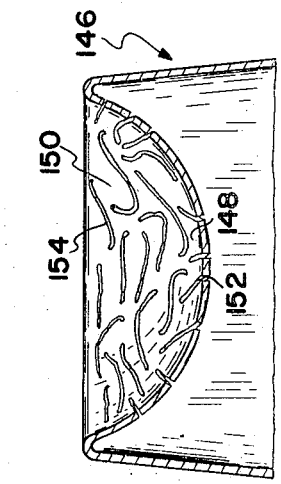
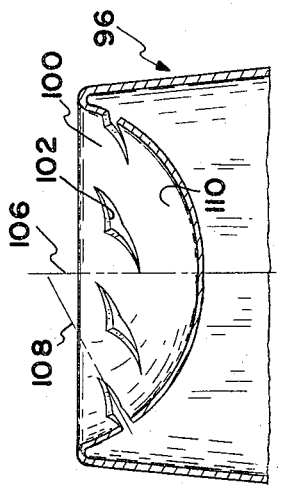
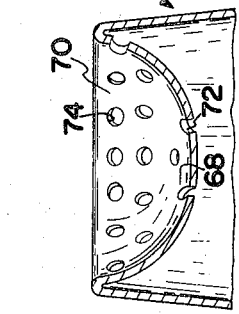
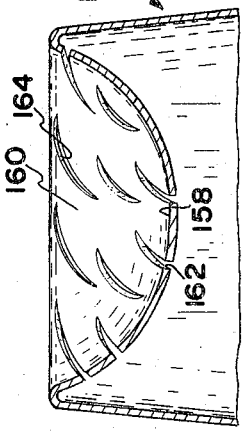
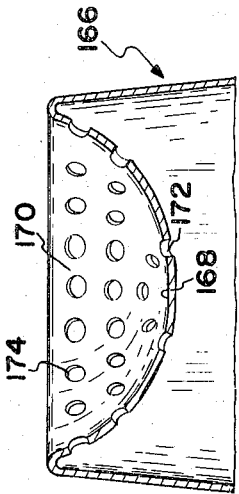
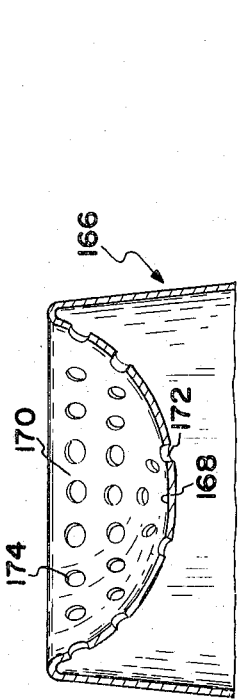
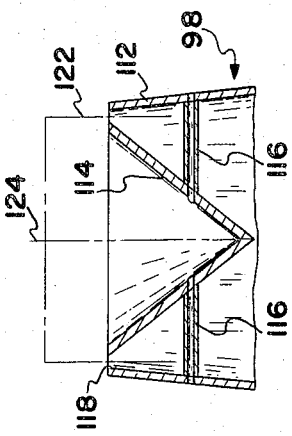
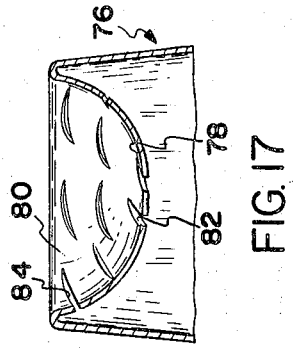
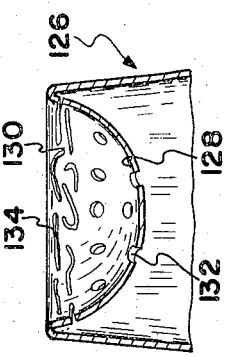

EXTRUDING FLOWER DESIGNS

BACKGROUND OF THE INVENTION

Flowers and like decorations for cakes have previously been made by individually forming each petal and leaf and individually placing the petals and leaves in an artistic fashion to simulate a flower. This process requires substantial skill, training and artistic ability and furthermore requires a substantial amount of time even for those well trained in this art. It will be appreciated that this technique is time consuming, relatively expensive and leaves much to be desired since the end result is subject to human error even at the hands of the most experienced and skilled personnel.

The prior art has recognized the deficiencies in the above described technique and has proposed use of extrusion devices for forming an entire flower in a one step operation. The disclosure of U.S. Pat. No. 2,419,654 constitutes a typical approach in the prior art. Although the device disclosed in this patent is capable of producing the flower decorations in a one step process, the artistic appearance of the flowers so formed leaves much to be desired. Upon analysis, it was determined that the petal forming strips extruded from this device tend to collapse toward the axis of extrudate movement. Although the decorations produced by the device of the aforementioned patent resemble flowers, one cannot discern the type of flower thereby produced. Thus the quality of the extruded flower is unacceptable for cake decorating purposes and other situations requiring a realistic simulated flower. It is perhaps for this reason that the approach disclosed in this patent has not achieved widespread usage.

Other disclosures of interest are found in U.S. Pat. Nos. 1,526,112; 2,572,960; 2,705,463; 2,750,900 and 2,928,533.

SUMMARY OF THE INVENTION

It is an object of this invention to provide method and apparatus for extruding realistically appearing flowers of various types by essentially a one step operation.

A further object of this invention is to provide method and apparatus for extruding flower designs in which the petals fall away from the axis of extrusion to produce realistically appearing flowers.

In summary, the flower extruding die of this invention comprises a perforate outlet section concave toward the downstream end of an axis of extrudate movement including inner and outer portions for separating the extrudate into a plurality of inner and outer petal forming strips and means for moving the terminal ends of the strips laterally away from the axis upon cessation of extrusion including means for emitting the outer strips at disproportionately greater angles of convergence with the axis than the inner strips.

In summary, the method of this invention comprises extruding, along an axis, a plurality of outer petal forming strips converging at a predetermined angle to the axis; collecting the plurality of outer petal forming strips on a support to provide a plurality of outer petals; extruding at least one inner petal strip along the same axis converging at a disproportionately smaller angle to the axis than the outer petal forming strips; and collecting the inner petal forming strip adjacent the convergence of the outer petal strips.

BRIEF DESCRIPTION OF THE DRAWINGS

FIG. 1 is a picture of a cake in which the flower decorations thereon were made with the method and apparatus of this invention;

FIGS. 2 and 3 disclose successive stages of extrusion in accordance with this invention;

FIGS. 6 and 16 are isometric and longitudinal cross sectional views respectively of a die for extruding a small chrysanthemum;

FIGS. 7 and 17 comprise isometric and longitudinal cross sectional views respectively of a die for extruding a small rose;

FIGS. 8 and 18 comprise isometric and longitudinal cross sectional views respectively of a die for extruding a daisy;

FIGS. 9 and 19 comprise partial isometric and longitudinal cross sectional views respectively of a die for extruding the outer petals of a daffodil;

FIGS. 10 and 20 comprise partial isometric and longitudinal cross sectional views respectively of a die for extruding the inner petals of a daffodil;

FIGS. 11 and 21 comprise partial isometric and longitudinal cross sectional views respectively of a die for extruding a peony;

FIGS. 12 and 22 comprise partial isomeric and longitudinal cross sectional views respectively of a die for extruding an aster;

FIGS. 13 and 23 comprise partial isometric and longitudinal cross sectional views respectively of a die for extruding a carnation;

FIGS. 14 and 24 comprise isometric and longitudinal cross sectional views respectively of a die for extruding a large rose;

FIGS. 15 and 25 comprise partial isometric and longitudinal cross sectional views respectively of a die for extruding a large chrysanthemum.

DETAILED DESCRIPTION OF THE PREFERRED EMBODIMENTS

Figure 26:
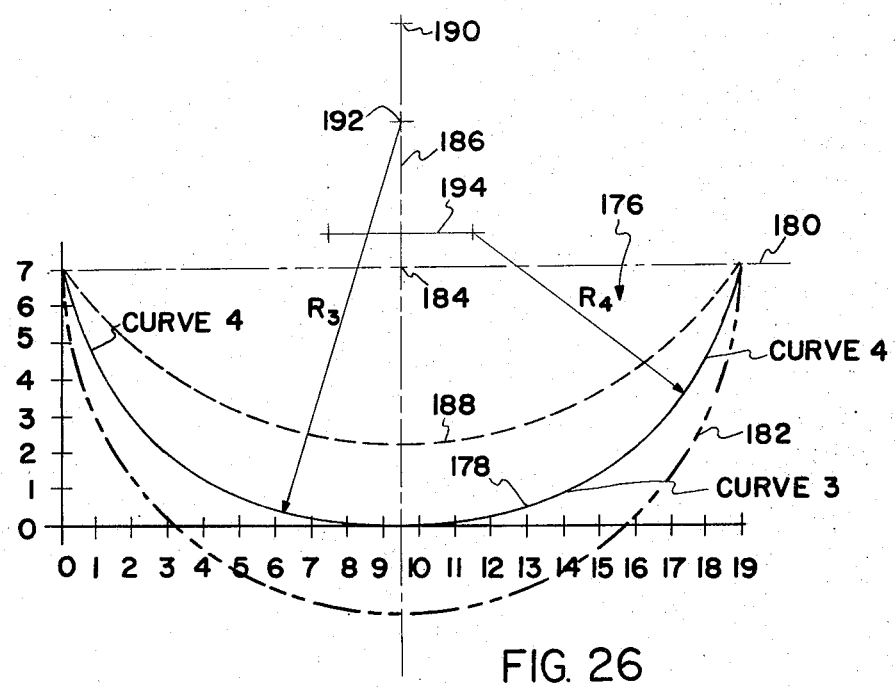
FIG. 26 is a view similar to FIG. 4 and illustrates a larger compound curve comprising a part of the larger dies of this invention.

Referring to FIG. 1, there is illustrated a cake which has been decorated with flowers produced by this invention. The flowers represented include a daffodil 10, a carnation 12, a rose 14 and a daisy 16. It will be apparent that the flowers produced by this invention are quite realistic and that the flower varieties can be readily distinguished. As will become more fully apparent hereinafter, the flowers shown in FIG. 1, as well as many others, can be quickly extruded by a minimally trained inexperienced person.

Referring to FIGS. 2 and 3, there is illustrated an extrusion die 18 which is attached to a suitable expressing means 17 such as a conventional flexible bag as shown in U.S. Pat. No. 2,419,654 or a plunger device such as shown in U.S. Pat. Nos. 2,705,463 and 2,928,533. The expressing means and die 18 are filled with a suitable plastic extrudate 20 which may either be edible, such as conventional confectionery paste or stiff unaerated frosting, potato paste or the like, or inedible, such as a thermosetting or thermoplastic organic polymer. Although the invention will be described in terms of decorating cakes with edible flower decorations, it will be apparent that this invention is readily usable for making inedible decorations.

As shown in FIG. 2, extrusion of the plastic material 20 begins by placing the die 18 adjacent a support 22 such as a cake, manipulating the expressing means to force the plastic material 20 through the apertures in the die 18 to form a plurality of petal forming strips 24 while concurrently moving the die 18 away from the support 22. Expressing the extrudate 20 through the die 18 continues until the petal forming strips 24 are of about the desired length.

FIG. 3 illustrates the termination of the flower forming operation. After a suitable amount of extrudate 20 has passed through the die 18, the expressing means is manipulated to stop movement of the extrudate 20 while movement of the die 18 away from the support 33 is continued. This causes the petal forming strips 24 to elongate and decrease in thickness adjacent the terminal ends 26 thereof. As will be more fully pointed out hereinafter, the terminal ends 26 of the strips 24 fall away from the axis of extrusion 28, defined by the die 18, in the direction indicated by the arrows in FIG. 3. This is in contrast with the operation of the device of U.S. Pat. No. 2,419,654 wherein the petal forming strips tend to collapse toward the extrusion axis or stand straight up supported by a larger crushed in base and thereby produce flower decorations of undesirable quality.

The difference in the quality of flower decorations produced by this invention and that of the prior art resides to a substantial extent in the direction of movement of the strips 24 from the die 18. The angle of the cuts in the die and the curvature of the die cause the material to curl toward the center or axis, causing the base of the petals to converge in the center as is indeed the way they actually are in nature. Then, because the petals are pulled out to various angles, they will fall out naturally as natural petals do. Referring to FIGS. 2 and 3, there is provided a concavity 30 of compound curvature including an outlet section 32 having a plurality of apertures 34 therein for separating the extrudate 20 into the petal forming stripes 24. The apertures 34 are perpendicular to the outlet section 32 so that the direction of movement of the strips 24 through the apertures 34 is controlled by the shape of the concavity 30. As will be pointed out more fully hereinafter, the angles of convergence defined by the extrusion axis 28 and the axes of the various apertures 34 is of substantial importance. The direction of the aperture axis is controlled, when the apertures 34 are perpendicular to the section 32 at the location of the individual apertures, by the shape of the concavity 30. Although not preferred, it is conceivable that the direction of movement of the strips 24 out of the die 18 may be controlled by the direction of the apertures 34 in a concavity of constant curvature.

Figure 4:
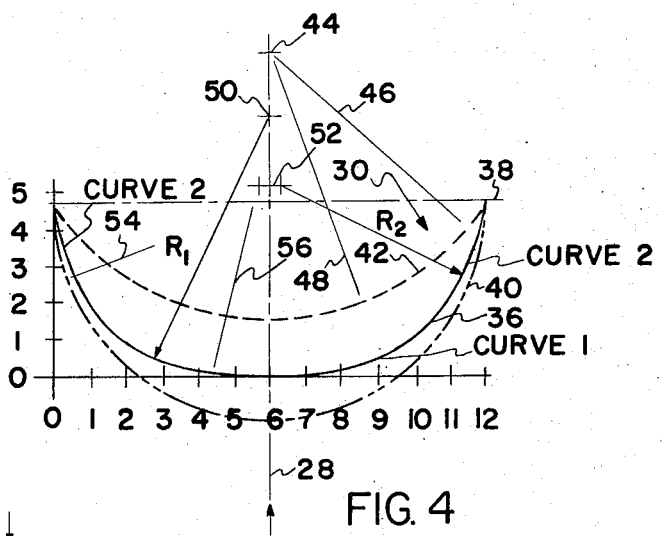
FIG. 4 illustrates a compound curve provided by the die of this invention and additional simple curves.

As shown in FIG. 4, the concavity 30 is illustrated as 12 units in diameter with the axis of extrusion 28 passing through the center thereof. The direction of extrudate movement is indicated by the arrow. The confines of the concavity 30 are defined by the curve 36 and a plane 38. For purposes of comparison, there is shown a simple arc 40 having a center of curvature at the juncture of the axis 28 and the plane 38 and a radius of 6 units. Also for purposes of comparison there is shown a simple arc 42 having a center of curvature 44 which corresponds substantially to the curvature of the concave perforate outlet of the device in U.S. Pat. No. 2,419,654. Since the arc 42 is of constant radius, the angle between the radius 46 and the axis 28 is proportionately larger than the angle between the radius 48 and the axis 28.

The curve 36 is of a compound type in which the central portion shown as CURVE 1 is of a radius $R_1$ having a center of curvature 50 outside the confines of the concavity 30. The outer portion of the curve 36 which is shown as CURVE 2 has a radius of $R_2$ with the center of curvature being defined by a locus of points 52 concentric about the extrusion axis 28. Since the curve 36 is of a compound nature, the angle defined between a radius 54 and the axis 28 is disproportionately greater than the angle between the radius 56 and the axis 28. Since the die apertures 34 are perpendicular to the curve 36, it will be seen that the petal forming strips 24 emitting from the outer portion of the concavity 30 converge, in the direction of extrusion, at a disproportionately greater angle than the petal forming strips emitting from the center of the outlet section 32.

The direction of movement of the petals produced by the device of U.S. Pat. No. 2,419,654 should be sharply contrasted. In this device, the petal forming strips emit from the die at an angle proportional to the location of the die opening in the concavity.

Figure 5:
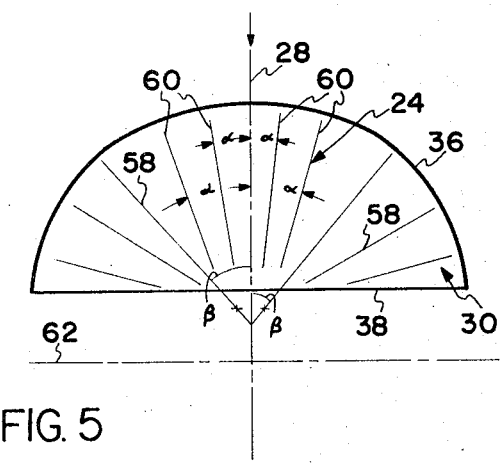
FIG. 5 is a schematic view of the compound curve of FIG. 4 and the petal forming strips extruded therethrough.

There is illustrated in FIG. 5 a schematic explanation of why the petal forming strips 24 fall away from the axis of extrusion 28. The petal forming strips 24 are illustrated as a plurality of outer petal forming strips 58 and a plurality of inner strips 60. Since the outer strips 58 define a disproportionately greater angle to the axis 28 and since extrusion occurs vertically, the angle between the outer strips 58 and a horizontal datum 62 is disproportionately smaller. It will accordingly be seen that the vertical force vector operating on the outer petals 58 because of gravity is disproportionately greater then the vertical force vector of gravity acting on the inner petals 60. Consequently, the outer petals 58 become more nearly horizontal than the inner petals 60 and thereby more realistically simulate flowers. The disproportionate gravitational force applied to the outer petals is further skewed with the use of many of the dies of this invention since the outer apertures therein are longer and wider to produce larger petals. The larger petals are, of course, of greater mass and consequently are subjected to greater gravitational attraction.

There are a number of additional factors which contribute in varying extent to the realistic appearance of the flowers shown in FIG. 1. Sharp corners at each die opening are highly desirable while, at most, a very small radius fillet may be used for reasons which are not readily discernible. Referring back to FIGS. 2 and 3, the die 18 includes an annular body 64 converging in the direction of extrudate movement. This aids in avoiding air bubbles and the like in the plastic extrudate 20. In addition, the annular die body 64 joins the outlet section 32 at a small acute angle of less than about 45°. This aids in preventing substantial buildup of the extrudate 20 at the junction.

As will be more fully apparent hereinafter, the principles of this invention may be applied to produce simulated flowers of many different types and sizes. One principle that should be kept in mind when designing dies for various flowers is that the outer petals are normally wider and thicker than the inner petals. Consequently, the die openings in the outer portion of the outlet section 32 should be longer and wider than the die openings in the central portion of the outlet section 32. Another principle of die design is that when the inner and outer petals of the flower change configuration substantially, the die openings must consequently be of different configurations. Normally, the openings of one configuration should be in the central portion of the die having the radius $R_1$ while the openings of the second configuration should be in the outer portion of the outlet section 32.

Referring to FIGS. 6 and 16, there is shown a die 66 for extruding a small chrysanthemum. The die 66 includes an inner perforate section 68 and an outer perforate section 70 defining a compound curvilinear concavity and including openings 72, 74 respectively. It will be seen that the openings 72, 74 are substantially perpendicular to the curvature of the concavity and provide sharp edges. It will also be noted that the outer openings 74 are of greater cross sectional area than the inner openings 72 so that the outer petals are slightly larger.

Referring to FIGS. 7 and 17, there is shown a die 76 for extruding a small rose. The die 76 includes inner and outer sections 78, 80 defining a concavity of compound curvature and having apertures 82, 84 respectively.

Referring to FIGS. 8 and 18, there is shown a die 86 for extruding a daisy having inner and outer sections 88, 90 defining a concavity of compound configuration having openings 92, 94 therein. It will be noted that the openings 94 are discernibly larger than the openings 92 to produce a larger outer petals as may be seen in FIG. 1 where a daisy 16, made by the die 86, is illustrated.

Referring to FIGS. 9, 10, 19 and 20, there are shown a pair of dies 96, 98 for extruding the outer and inner petals respectively of a daffodil 10 as shown in FIG. 1. The die 96 includes the now customary concavity including an outer portion 100 having openings 102 for forming the outer petals 104 (FIG. 1). The die 96 provides an axis of extrusion 106. The openings 102 define axes 108 converging with the extrusion axis 106 at a disporportionately large angle in much the same manner that the axis of the outer openings 34 define disproportionately large angles with the extrusion axis 28 as explained with respect to FIGS. 2–5. It will accordingly be seen that the strips emitting from the openings 102 converge toward the downstream end of the axis 106 at a disproportionately large acute angle. The inner portion 110 of the concavity is imperforate for reasons more fully apparent hereinafter.

As shown in FIGS. 10 and 20, the inner petal forming die 98 includes an annular imperforate outer die body 112, an imperforate inner die body 114 and support 116 connecting the die bodies 112, 114. At least one of the supports 116 must be hollow to allow air to reach the interior of the die body 114 so that a vacuum is not created which would otherwise cause the trumpet of the flower to collapse. The inner and outer die bodies 112, 114 define therebetween an annular die opening 118 for extruding an inner petal 120 (FIG. 1). The die opening 118 consequently defines an annular path 122 of strip movement which is substantially parallel to the axis 124 of extrusion. It will accordingly be seen that the path 122 of strip movement defines a disproportionately smaller angle with the axis 124 than does the corresponding strips emitting from the openings 102 of the die 96.

When forming a daffodil decoration, the die 96 is first used to extrude the outer petals 104 by placing the axis 106 in a substantially vertical position. After the outer petals 104 are in place, the die 98 is positioned vertically thereabove such that the axis 124 is substantially concentric with the axis of extrusion of the petals 104 and the inner petal 120 is extruded adjacent the convergence of the outer petals 104.

Referring to FIGS. 11 and 21, there is shown a die 126 for extruding a peony. The concavity provided by the die 126 includes inner and outer portions 128, 130 having openings 132, 134 respectively therein. It will be noted that the inner openings 132 are of one configuration to produce the desired shape of the inner petals while the outer openings 134 are of a different configuration to produce the desired shape of the outer petals. The change in configuration of the openings preferably occurs at the juncture of the inner and outer portions 128, 130 which is determined by the junction of the different curvatures of the inner and outer portions 128, 130.

Referring to FIGS. 12 and 22, there is shown a die 136 for extruding an aster. The die 136 comprises inner and outer portions 138, 140 having openings 142, 144 respectively therein. As is most apparent from FIG. 22, the size of the openings 142, 144 decrease toward the axis of extrusion.

Referring to FIGS. 13 and 23, there is shown a die 146 for extruding the carnation 12 shown in FIG. 1. The die 146 includes the concavity of compound curvature having inner and outer portions 148, 150 having openings 152, 154 therein.

Referring to FIGS. 14 and 24, there is shown a die 156 for extruding the large rose 14 shown in FIG. 1. The die 156 comprises a concavity of compound curvature including inner and outer portions 158, 160 having openings 162, 164 respectively therein. The inner openings 162 are substantially smaller than the outer openings 164. Since the flower shown in U.S. Pat. No. 2,416,654 is alleged to be a rose, it seems pertinent to compare the rose 14 therewith. It will be apparent that the inner petals of the rose 14 are inclined slightly with respect to the vertical while the outer petals are disproportionately inclined thereto. This is in contrast with the showing of the aforementioned patent where the inner and outer petals appear to be proportionately inclined to the vertical.

Referring to FIGS. 15 and 25, there is shown a die 166 for extruding a large chrysanthemum. The die 166 includes the concavity of compound curvature having inner and outer portions 168, 170 including openings 172, 174 therein. As will be readily apparent, the size of the openings 172, 174 decrease toward the axis of extrusion.

Referring to FIG. 26, there is shown a concavity 176 bounded by an arc 178 of compound curvature and a plane 180. The configuration of the arc 178 represents generally the shape of the concavities in the larger dies shown in FIGS. 9–25. It will be seen that the concavity 176 is approximately 19 units in diameter and seven units in depth. For purposes of comparison, there is shown an arc 182 of simple curvature having a radius of approximately nine and one half units and a center of curvature 184 at the intersection of the extrusion axis 186 and the plane 180. Also shown for purposes of comparison is an arc 188 of approximately the same proportion as that shown in U.S. Pat. No. 2,419,654 having a center of curvature 190. The inner portion of the arc 178 is shown as the curve 3 as defined by a radius $R_3$ having a center of curvature 192 outside the confines of the concavity 176. The outer portion of the arc 178 is illustrated as curve 4 in FIG. 26 and is defined by a radius $R_4$ having a center of curvature described by a locus of points 194 concentric about the extrusion axis 186.

As dramatically shown in FIG. 1, the method and apparatus of this invention provides for the extrusion of high quality flower decorations in a simple and expeditious manner.

I claim:

1. A device for extruding flower designs, comprising; an open ended non-partitioned extrudate reservoir terminating in an apertured flower extruding die defining an axis of extrusion and having an inner extrudate engaging surface extending inwardly toward said reservoir and in open communication with the interior thereof; said apertured extruding die including central and peripheral extrusion apertures respectively adjacent and remote from the extrusion axis in open communication with said reservoir for separating the extrudate into a plurality of central and peripheral petal forming strips; and said peripheral extrusion apertures defining a disproportionately greater angle of convergence with the extrusion axis than said central extrusion openings.

2. A device for extruding flower designs comprising:

a non-partioned extrudate reservoir having an outlet; and a flower extruding die comprising an inlet for receiving all the extrudate emitting from the reservoir and a perforate outlet having an outer surface concave toward the downstream end of an axis of extrudate movement and an inner surface, the entire area of the inner surface being in open communication with the reservoir outlet, the die outlet including inner and outer perforate portions for separating the extrudate into a plurality of inner and outer petal forming strips, the openings in the outer perforate section defining a disproportionately greater angle of convergence with the axis than the openings in the inner perforate section.

3. The flower extruding die of claim 2 wherein the openings define sharp edges.

4. The flower extruding die of claim 2 wherein the body of said extruding die converges in the direction of extrudate movement.

5. The flower extruding die of claim 2 wherein the body of extruding die is affixed to the outer perforate portion and defining at the juncture thereof an angle less than about 45°.

6. The flower extruding die of claim 2 wherein the outer perforate portion completely surrounds the inner perforate portion.

7. The flower extruding die of claim 2 wherein the inner portion provides a first curvature, the outer portion provides a second greater curvature and the openings in the inner and outer portions are substantially perpendicular to the outlet section at the location of the openings.

8. The flower extruding die of claim 7 wherein the inner portion openings are of predetermined cross sectional area and the outer portion openings are of greater cross sectional area.

9. The flower extruding die of claim 7 wherein the inner portion openings are of a first configuration and the outer portion openings are of a second configuration.

10. The flower extruding die of claim 7 wherein the first curvature is defined by a predetermined radius and the second curvature is defined by a shorter predetermined radius.

11. The flower extruding die of claim 10 wherein the center of said predetermined radius is outside the confines of the concave section and the center of said shorter predetermined radius is defined by a locus of points, closer to the confines of the concave section, concentric with the axis.

* * * * *